United States Patent [19]
Nomi

[11] Patent Number: 5,190,806
[45] Date of Patent: Mar. 2, 1993

[54] LIQUID-PENETRATION-RESISTANT SORBENT LAMINATE

[75] Inventor: Haruo Nomi, Okayama, Japan

[73] Assignee: W. L. Gore & Associates, Inc., Newark, Del.

[21] Appl. No.: 901,316

[22] Filed: Jun. 19, 1992

[30] Foreign Application Priority Data

Jul. 4, 1991 [JP] Japan .................. 3-190738

[51] Int. Cl.[5] .................. B32B 7/12; B32B 3/26
[52] U.S. Cl. .................. 428/198; 428/246; 428/284; 428/315.5; 428/315.9; 428/316.6; 428/317.1; 428/317.7; 428/323; 428/422
[58] Field of Search .......... 428/198, 246, 284, 315.5, 428/315.9, 316.6, 317.1, 317.7, 323, 422

[56] References Cited

U.S. PATENT DOCUMENTS

| | | | |
|---|---|---|---|
| 3,953,566 | 4/1976 | Gore | 428/422 |
| 4,187,390 | 2/1980 | Gore | 428/315.5 |
| 4,454,191 | 6/1984 | von Blücher et al. | 428/244 |
| 4,455,187 | 6/1984 | von Blücher et al. | 156/277 |
| 4,510,193 | 4/1985 | von Blücher et al. | 428/196 |
| 4,554,198 | 11/1985 | von Blücher et al. | 428/143 |
| 4,677,019 | 6/1987 | von Blücher | 428/244 |
| 4,888,245 | 12/1989 | Witzko | 428/422 |
| 4,946,736 | 8/1990 | Sassa | 428/422 |
| 4,954,388 | 9/1990 | Mallouk et al. | 428/422 |
| 5,036,551 | 8/1991 | Dailey et al. | 428/422 |
| 5,104,727 | 4/1992 | Wnenchak | 428/422 |

*Primary Examiner*—William J. Van Balen
*Attorney, Agent, or Firm*—Gary A. Samuels

[57] ABSTRACT

A laminated composite material containing sorbent particles which are protected from contact by liquids. The materials can be used in devices to sorb gases and vapors and are suitable for use in chemical protective clothing.

5 Claims, 2 Drawing Sheets

LIQUID-PENETRATION-RESISTANT SORBENT LAMINATE

FIELD OF THE INVENTION

The present invention relates to composite laminated materials for sorption of harmful or noxious vapors.

BACKGROUND OF THE INVENTION

For convenience in handling powdered sorbent materials methods such as encapsulation of the powders, or forming mixtures of the powders and plastic resins into flexible sheets, or adhering the powders to flexible supports are known.

Plastic resins including polyolefins, poly(methyl methacrylate), poly(vinyl alcohol), ABS resins, and the like, have been mixed with sorbent powders and formed into sheet. These products have little or no gas permeability, and their rate of sorption is poor because the surface of the sorbent is substantially coated with the plastic resin.

Constructions in which sorbent powders are adhered to fabric or cloth supports with adhesives also have drawbacks, in that they have low durability as the sorbent powders can be easily dislodged by mechanical action. If the sorbent powders are adhered with sufficient adhesive to provide good durability, the sorbent surface is substantially coated with adhesive and the rate of sorption is poor.

Filters and other porous media comprising composite layered constructions containing powdered sorbent materials designed to adsorb, absorb, detoxify, or react with harmful or noxious vapors are known in the art. Likewise, protective clothing for hazardous or toxic chemicals comprising composite layered constructions containing powdered sorbent materials are also known in the art.

Such products and articles are often porous, that is, they have continuous pores or passageways through them so that gases and vapors can easily enter or pass through them thus accessing the sorbent powders. These products and articles function very effectively in dry environments or under conditions in which they are not contacted by liquids. When contacted by water, organic solvents, or other organic liquids, the sorbent powders may be wet by the liquids and their ability to sorb gases and vapors greatly reduced. "Liquid barrier" layers designed to prevent passage of harmful liquids may be used, and are typically positioned so as to prevent direct contact of the liquid with the sorbent material. Some such "liquid barriers" are air-permeable fabrics which have been treated with repellent finishes. Such systems lack in that they will allow aerosols and particulates to pass through, and with minimum pressure, liquids will pass. Other air-impermeable "liquid barriers" provide adequate protection against liquids but are water-vapor-impermeable or have limited water-vapor-permeability. Clothing lacking water-vapor-permeability do not "breathe", i.e. allow passage of water vapor and thus, are uncomfortable to the wearer.

SUMMARY OF THE INVENTION

This invention provides a powdered-sorbent-containing composite layered material that protects the sorbent from contact and contamination by liquids, and that has good vapor permeability thus providing for passage of water vapor therethrough and sorption of harmful and noxious vapors and gases.

In its simplest form the invention is a layered construction of a liquid-penetration-resistant water-vapor-permeable composite material comprising at least two layers of porous fluoropolymer film, each of the fluoropolymer film layers having a continuous non-porous coating of water-vapor-permeable adhesive on the sides facing each other and each of the coated fluoropolymer film layers separated by a layer of sorbent particles bonded to the adhesive coating.

Another embodiment of the invention is the form described above having a layer of woven, knit, or non-woven fabric laminated to at least one outer surface to provide additional mechanical support and protection.

DETAILED DESCRIPTION OF THE INVENTION

Figure 1:
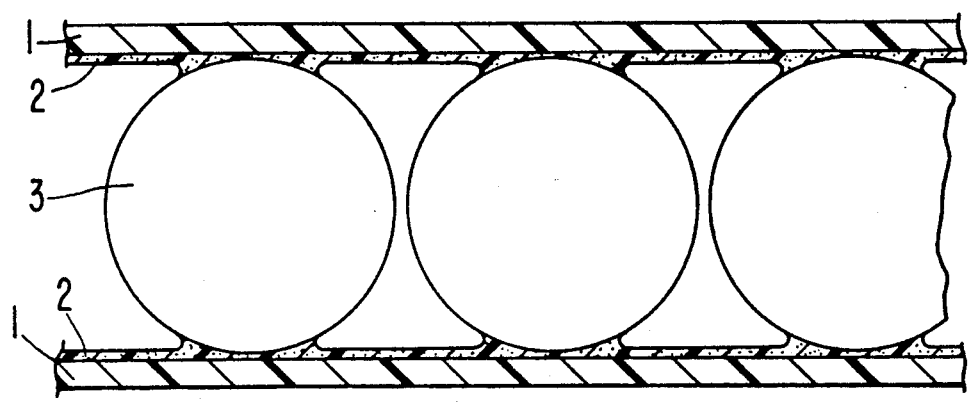
FIG. 1 is a cross-sectional view of the embodiment of the invention described in claim 1.

Referring to FIG. 1, the composite layered material of the invention can be prepared by coating a surface of a first porous fluoropolymer film 1 with a continuous non-porous layer of water-vapor-permeable adhesive 2 upon which a layer of sorbent particles 3 are dispersed and bonded. In like manner, a second porous fluoropolymer film 1 is coated with a continuous non-porous layer of water-vapor-permeable adhesive 2 and laminated to the sorbent particles 3 to complete the construction shown in FIG. 1.

The porous fluoropolymer film 1 of the invention should have an average pore diameter less than 10 micrometers, preferably less than 1 micrometer; and a pore volume of 15 to 95%, preferably 50 to 95%. The film can be 10 to 300 micrometers in thickness, preferably it is 20 to 100 micrometers thick. Suitable porous fluoropolymer films may be of polytetrafluoroethylene, tetrafluoroethylene/hexafluoropropylene copolymers, polyvinylidene fluoride, poly(vinyl fluoride), and the like. Preferred films are porous polytetrafluoroethylene films and, more preferably, porous expanded polytetrafluoroethylene films which are described in U.S. Pat. No. 3,953,566 (Gore) and U.S. Pat. No. 4,187,390 (Gore).

Various well known conventional adhesives used to adhere porous fluoropolymer films can be used as the water-vapor-permeable adhesive of the invention. Adhesives selected from the types including hydrophilic polyurethane resins, such as a compound of Hypol 2000 TM hydrophilic polyurethane prepolymer (manufactured by W. R. Grace & Co.) and polyethylene glycol; polyamino acid resins, such as Ajikohto (manufactured by Ajinomoto Co., Inc.); and perfluorosulfonic resins, such as Nafion TM (manufactured by E. I. DuPont de Nemours & Co., Inc. and distributed by Aldrich Chemical Co.); and the like, are suitable for this purpose.

The water-vapor-permeable adhesives can be applied to the porous fluoropolymer film surface by conventional methods such as roll coating and the like. The water-vapor-permeable adhesive can be applied to provide a continuous non-porous coating on the fluoropolymer film surface 5 to 100 micrometers in thickness, preferably 5 to 50 micrometers thick. The water-vapor-permeability rate of the water-vapor-permeable adhesive layer should be at least 80 g/m² per hour.

Conventional, well known sorbents, including those having physisorption or chemisorption characteristics, can be used. These kinds of sorbents can be in particle form or fiber form; examples include powdered activated carbon and activated carbon fibers, and also include varieties of porous material such as silica gel, alumina, silica alumina, magnesia, zeolites, and sepiolites, as well as products obtained by surface treating these porous materials with an acid or alkali, or those which have previously been made to adsorb a specific organic or inorganic compound component in order to raise the rate of adsorption with respect to a specific gas component. The adsorbent should be under 1000 micrometers in diameter, and should preferably be under 700 micrometers. When the particle diameter of the adsorbent is greater than 1000 micrometers, the structure which is formed in the interface between the adsorbent and the adhesive resin becomes bulky, and the bonding of the adsorbent is inadequate.

By continuing the steps described above it is possible to add layers in the prescribed manner to make the composite layered material of the invention having multiple sorbent layers.

Figure 2:
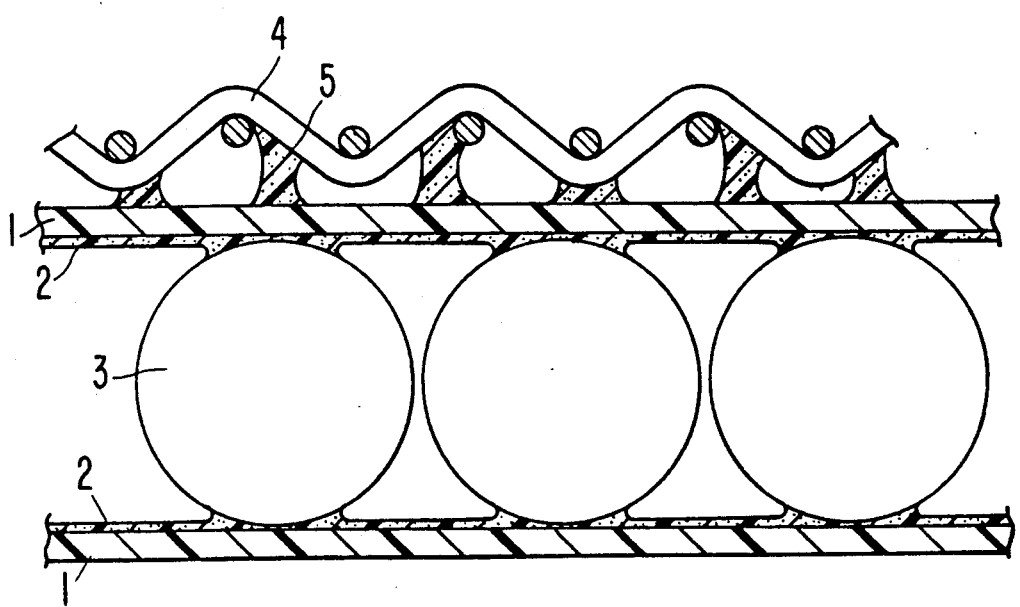
FIG. 2 is a cross-sectional view of another embodiment of the invention described in claim 5.

In FIG. 2 is depicted another preferred embodiment of the invention in which a layer of fabric 4 is laminated to the outer surface of the porous fluoropolymer film 1 of the construction shown in FIG. 1, and adhered by a discontinuous porous layer of adhesive 5.

Figure 3:
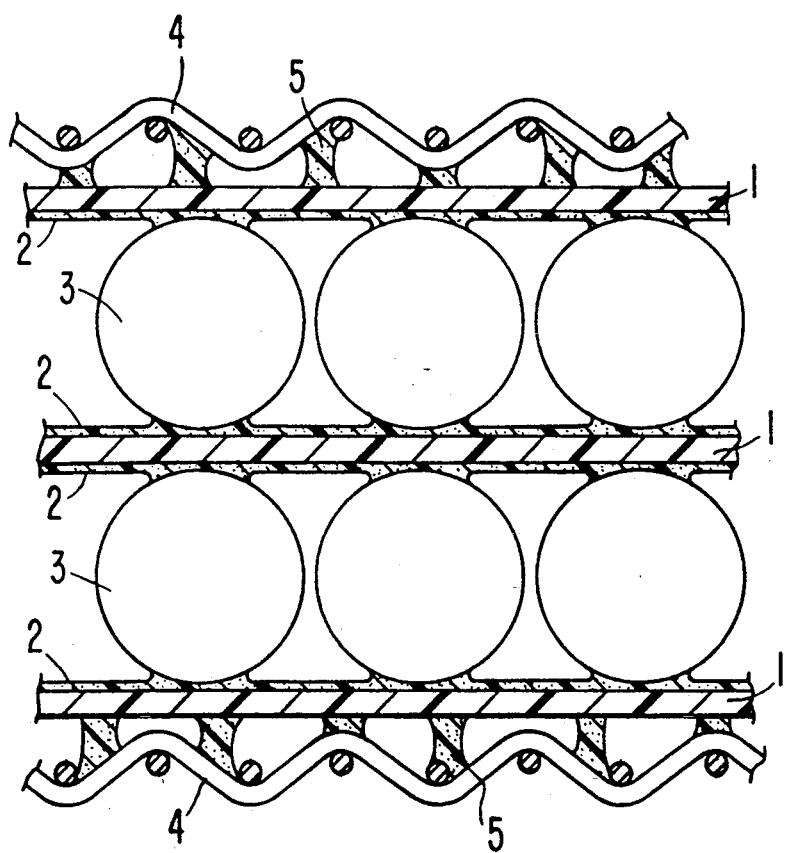
FIG. 3 is a cross-sectional view of an embodiment of the invention having multiple sorbent layers.

FIG. 3 illustrates an embodiment of the invention having multiple sorbent layers. In the depicted embodiment are two layers of sorbent particles 3 adhered on each side to porous fluoropolymer film 1 by a continuous non-porous coating of water-vapor-permeable adhesive 2. Fabric layers 4 are laminated to the uncoated surfaces of the porous fluoropolymer film 1 by a discontinuous porous layer of adhesive 5.

Synthetic polymer fibers or natural fibers in woven, knit, or non-woven porous fabric forms can be used as the fabric layer 4.

The adhesive used to bond the fabric layer 4 to the porous fluoropolymer film layer 1 may be selected from many known in the art. Suitable adhesives may be found in, but not limited to, the classes consisting of thermoplastics, thermosets, or reaction curing polymers. So that moisture permeability through the laminate will not be impaired the adhesive is preferably applied, by conventional methods, in a discontinuous porous layer, for example, at uniform intervals by gravure printing techniques.

TEST DESCRIPTIONS

Pore Size Measurement

Pore size measurements were made using an automated liquid porosimeter (Coulter Porometer, Coulter Electronics, Inc.) according to the procedure described in ASTM E 1294-89 (Standard Test Method for Pore Size Characteristics of Membrane Filters using Automated Liquid Porosimeter).

Water-Vapor Permeability

Measured in conformity with Test Method JIS-L-1099-B. Results are reported as grams/square meter per hour.

Liquid-Water Permeability and Toluene Permeability 1 ml of water and 1 ml of toluene were applied to one side of a sample. The other side of the sample was examined after five minutes had elapsed to determine if any liquid had permeated through the sample. Results are reported as follows:

O: no permeated liquid present
X: permeated liquid present

Carbon Tetrachloride Adsorption

Pre-weighed test samples are suspended in a laboratory desiccator jar above a pool of carbon tetrachloride. The desiccator is placed in a temperature-controlled chamber maintained at 40 degrees centigrade for a period of 16 hours after which it is removed from the chamber and allowed to cool to room temperature. The samples are then removed from the desiccator and re-weighed. Weights are recorded to the nearest milligram.

The initial weight of the sample, $W1$, is subtracted from the final weight of the sample, $W2$. The difference in weight is the amount of carbon tetrachloride adsorbed by the sample. The results are reported as milligrams (carbon tetrachloride) per square meter (sample surface).

EXAMPLE 1

A knit fabric of nylon fibers, having a weight of 55 g/m² laminated to a porous expanded polytetrafluoroethylene film having 85% pore volume, 0.2 micrometer average pore diameter, and 25 micrometer thickness; using a polyurethane adhesive. The polyurethane adhesive, HI-BON 4032 ™ (manufactured by Hitachi Kasei Polymer Co.), was applied in discontinuous form by gravure printing techniques and covered approximately 40% of the porous expanded polytetrafluoroethylene film surface. The laminate thus formed is identified as Laminate A.

Next, a water-vapor-permeable polyurethane resin was applied by roll coater at a solid component application weight of 5 g/m² to the film side of Laminate A. The water-vapor-permeable polyurethane resin was a compound of Hypol 2000 ™ hydrophilic polyurethane prepolymer and polyethylene glycol having OH/NCO groups in equivalent ratio of 0.9. Prior to drying the resin, adsorbent carbon particles were uniformly dispersed onto the resin surface; following heat treatment at 160° C. for 5 minutes, the unbonded carbon particles were removed, leaving a layer of particles weighting 240 g/m². The adsorbent carbon particles, BAC-MP ™, were approximately 500 micrometers in diameter and were manufactured by Kureha Chemical Industry Co., Ltd. This material is identified as Laminate B.

Then, the water-vapor-permeable polyurethane resin described above was applied by roll coater to a second piece of Laminate A at a solid component application weight of 10 g/m² and, prior to drying, laminated to Laminate B with the resin surface in contact with the carbon particles. This material is identified as Laminate C.

EXAMPLE 2

A multiple sorbent layer example was made by laminating a layer of Laminate B, prepared as described in Example 1 above, to each side of porous expanded polytetrafluoroethylene film described in Example 1, after coating each side of the film with a layer of the water-vapor-permeable polyurethane resin used in Example 1. The water-vapor-permeable polyurethane resin was applied by roll coater at a solid component application weight of 10 g/m². The layers of Laminate B were bonded with the carbon sorbent particles facing inwardly thus producing a layered composite having two layers of sorbent particles and having fabric on both outer surfaces as shown in FIG. 3. This material is identified as Laminate D.

Samples of Laminates C and D were tested for water-vapor-permeability, carbon tetrachloride adsorption, and liquid-water and toluene permeability. Test results are shown in Table 1.

TABLE 1

| Sample | Laminate Weight (g/m2) | Water-vapor Permeability (g/m2/hour) | CCL4 Adsorption (mg/cm2) | Liquid Water Permeability | Liquid Toluene Permeability |
|---|---|---|---|---|---|
| Laminate C | 400 | 320 | 11.4 | 0 | 0 |
| Laminate D | 634 | 190 | 25.5 | 0 | 0 |

As shown in Table 1, Laminates C and D of the present invention were outstanding in terms of gas adsorption and water-vapor-permeability, and were not susceptible to liquid penetration.

Additionally, both Laminates C and D were sufficiently flexible and durable for use as clothing materials. For example, Laminates C and D were washed for 10 washing cycles in a household washing machine and exhibited virtually no deterioration of the laminate or damage to the carbon particle base.

The composite laminated materials of the invention surprisingly provide exceptional resistance to through-penetration of liquids while at the same time having good vapor permeability thus providing for passage of water vapor and sorption of harmful and noxious vapors.

The porous fluoropolymer films are inherently hydrophobic and the preferred porous expanded polytetrafluoroethylene films provide excellent resistance to penetration by liquid water or other aqueous liquids, thus providing a measure of protection to the water-vapor-permeable adhesive coating. Furthermore, the fluoropolymer films are chemically inert and resistant to attack by most chemicals. The non-porous water-vapor-permeable adhesive coating provides a continuous barrier to penetration by other liquids but can be permeated by gaseous diffusion at molecular levels thus providing for passage of water vapor and sorption of other vapors and gases by selected sorbents.

By combining the liquid-penetration-resistance water-vapor-permeable with porous materials, such as textiles and fabrics, that provide increased support and mechanical protection, strong flexible laminates suitable for many uses can be made, for example, abrasion-resistant noxious gas adsorbing filters, chemical protective clothing, and the like.

I claim:

1. A liquid-penetration-resistant water-vapor-permeable composite material comprising
   (a) at least two layers of porous fluoropolymer film, each having on the surfaces facing each other
   (b) a non-porous coating of water-vapor-permeable adhesive; said porous fluoropolymer films separated by a layer of sorbent particles bonded to said water-vapor-permeable adhesive coating.

2. The liquid-penetration-resistant water-vapor-permeable composite material of claim 1 wherein the water-vapor-permeable adhesive is a hydrophilic polyurethane adhesive.

3. The liquid-penetration-resistant water-vapor-permeable composite material of claim 2 wherein the porous fluoropolymer film is expanded polytetrafluoroethylene.

4. The liquid-penetration-resistant water-vapor-permeable composite material of claims 1, 2, or 3, wherein the sorbent powder particles are selected from the class consisting of carbon, alumina, or silica.

5. The liquid-penetration-resistant water-vapor-permeable composite material of claim 4, wherein at least one outer surface of the porous fluoropolymer film is laminated to fabric.

* * * * *